United States Patent [19]
Maxson

[11] Patent Number: 5,239,035
[45] Date of Patent: Aug. 24, 1993

[54] CURABLE ORGANOSILOXANE GEL COMPOSITIONS

[75] Inventor: Myron T. Maxson, Sanford, Mich.

[73] Assignee: Dow Corning Corporation, Midland, Mich.

[21] Appl. No.: 865,514

[22] Filed: Apr. 9, 1992

[51] Int. Cl.$^5$ .............................................. C08G 77/06
[52] U.S. Cl. ................................. 528/115; 525/100; 525/105; 525/106
[58] Field of Search ................. 528/15; 525/100, 105, 525/106

[56] References Cited
U.S. PATENT DOCUMENTS

| | | | |
|---|---|---|---|
| 3,020,260 | 2/1962 | Nelson | 260/46.5 |
| 4,100,627 | 7/1978 | Brill, III | 3/36 |
| 4,350,709 | 7/1982 | Jeram et al. | 528/15 |
| 4,535,141 | 8/1985 | Kroupa | 528/15 |
| 4,719,275 | 1/1988 | Benditt et al. | 528/15 |
| 5,169,727 | 12/1992 | Boardman | 528/15 |

Primary Examiner—Melvyn I. Marquis
Attorney, Agent, or Firm—Robert Spector

[57] ABSTRACT

The amount of solvent-extractable materials present in organosiloxane gels cured by a platinum-catalyzed hydrosilylation reaction can be reduced without sacrificing other desirable properties the gels when the curable composition used to prepare the gel comprise a first polydiorganosiloxane with vinyl or other ethylenically unsaturated hydrocarbon radicals only at the terminal positions, a second polydiorganosiloxane with silicon bonded hydrogen atoms only at the terminal positions and a crosslinking reactant containing at least three alkenyl radicals or silicon-bonded hydrogen atoms per molecule. The number of silicon-bonded hydrogen atoms or alkenyl radicals in excess of 2 per molecule of crosslinking reactant constitute from 10 to 30 percent of these reactive groups present in the curable composition.

6 Claims, No Drawings

CURABLE ORGANOSILOXANE GEL COMPOSITIONS

BACKGROUND OF THE INVENTION

1. Field of the Invention

This invention relates to organosiloxane compositions curable by a platinum catalyzed hydrosilylation reaction to yield gels. More particularly, this invention relates to organosiloxane compositions that cure to yield soft gels exhibiting levels of dielectric properties desired for encapsulation of electronic devices in addition to a low level of extractable materials. Preferred compositions contain fluorinated alkyl radicals as substituents on a majority of the silicon atoms.

2. Description of Relevant Art

Polyorganosiloxane compositions that cure using a platinum catalyzed hydrosilylation reaction to form gels are known. Organosiloxane gels are described in U.S. Pat. No. 3,020,260, issued to Nelson on Feb. 6, 1962, and in U.S. Pat. No. 4,719,275, issued to Benditt and Maxson on Jan. 12, 1988. The gels described by Nelson are obtained by reacting an organosiloxane containing two silicon-bonded hydrogen atoms per molecule with a vinyl-containing copolymer wherein the repeating units are of the formulae $RViSiO$, $R_2SiO$, and $CH_3R_2SiO_{0.5}$, R is methyl or phenyl and Vi represents vinyl.

The patent issued to Benditt and Maxson teach reacting (1) a polydiorganosiloxane containing fluorinated hydrocarbon radicals bonded to the silicon atoms together with at least two vinyl or other ethylenically unsaturated radicals per molecule with (2) an organohydrogensiloxane containing at least three silicon-bonded hydrogen atoms per molecule.

One method for reducing the hardness of cured organosiloxane gels prepared by a hydrosilylation reaction is to provide in the curable composition a molar excess of either silicon-bonded hydrogen atoms or ethylenically unsaturated hydrocarbon radicals such as vinyl. This results in relatively large amounts of unreacted liquid material in the cured gel that can be easily extracted from the cured gel. The presence of this liquid material can adversely affect both the heat stability of the gel and its resistance to degradation by the liquid hydrocarbons present in fuel and hydraulic fluids.

A second method for reducing the hardness of cured organosiloxane gels is to include in the curable composition (1) an organopolysiloxane containing two vinyl or other ethylenically unsaturated hydrocarbon radicals and (2) two types of organohydrogensiloxanes, one of which contains an average of at least three silicon-bonded hydrogen atoms per molecule, referred to as a crosslinking agent. The second type of organohydrogensiloxane contains two silicon bonded hydrogen atoms and is referred to as a chain extender. The relative amounts of silicon-bonded hydrogen present in the crosslinker and the chain extender determines the degree of crosslinking, which, in turn is one factor determining the hardness of the cured gel.

U.S. Pat. No. 4,340,709, which issued to Jeram et al. on Jul. 20, 1982 described organosiloxane compositions curable by a platinum-catalyzed hydrosilylation reaction. The composition contains a polydiorganosiloxane with vinyl radicals located only at the two terminal positions and the two types of organohydrogensiloxanes referred to in the preceding paragraph. The chain extender, referred to in this patent as a "linear hydride coupler", and the crosslinker each contribute at least 10 percent of the total silicon-bonded hydrogen atoms present in the curable composition. Jeram et al. disclose compositions containing from 4 to 19.4 weight percent, based on the weight of vinyl-containing polydiorganosiloxane, of linear hydride coupler.

Organosiloxane gels exhibiting reduced leakage of liquid organosiloxanes are described in U.S. Pat. No. 4,100,627, which issued to Brill on Jul. 18, 1978. The organosiloxane compositions used to prepare this gel comprise a dimethylvinylsiloxy-terminated polydimethylsiloxane exhibiting a viscosity of from 0.1 to 6 Pa.s, a dimethylhydrogensiloxy-terminated polydimethylsiloxane (referred to in the present specification as a chain extender) with a viscosity of less than 0.5 Pa.s, a polymethylsiloxane having at least three silicon-bonded hydrogen atoms and a hydrosilylation catalyst. The amount of dimethylhydrogensiloxy-terminated polymer is sufficient to impart a viscosity of from 4.5 to 30 Pa.s. The curable compositions exemplified in this patent contain from 97.5 to 99.9 parts by weight of the vinyl-terminated polymer and from 1.7 to 3.3 parts by weight of the chain extender. The effective viscosity of the chain-extended polymer ranged from 4.6 to 13 Pa.s.

Organosiloxane compositions that cure by reaction of a dimethylvinylsiloxy-terminated dimethylpolysiloxane with the combination of chain extender and a crosslinking agent, both of which contain methyl as the only silicon-bonded hydrocarbon radical, are described by Kroupa in U.S. Pat. No. 4,535,141, which issued on Aug. 13, 1985. The curable compositions also contain a resinous polyorganosiloxane as a reinforcing agent.

From 85 to 95 percent of the silicon-bonded hydrogen atoms in the curable compositions described by Kroupa are present in the organohydrogensiloxane containing silicon-bonded hydrogen atoms only at the terminal positions. In addition, the molar ratio of silicon-bonded hydrogen atoms contained in this ingredient to the vinyl radicals present in the curable composition is at least 1.6. The gels produced using the curable compositions described in the Kroupa et al. patent are relatively hard, tough, resilient and can be fabricated into optical waveguides such as touch sensitive screens used as input devices for computers. The compressability of organosiloxane gels is typically measured by applying a weighted load in the form of a conical or cylindrical foot to the surface of the gel. The weight required to compress a surface of a cured gel a distance of 0.23 millimeter is typically from 14.5 to 49 grams. Gels of this type are too hard for use as potting or encapsulating materials for electronic components such as transistors and integrated circuits.

One objective of this invention is to provide cured organosiloxane gels of sufficient softness for use as a potting and encapsulant material but which do not contain significant concentrations of unreacted organosiloxanes.

A second objective is to improve the dielectric properties, particularly dielectric constant and dissipation factor, of preferred organosiloxane gels containing methyl and 3,3,3-trifluoropropyl as the organic groups bonded to silicon.

The present inventor discovered that these objectives can be achieved by increasing the relative concentration of the diorganohydrogensiloxy terminated polydiorganosiloxane referred to hereinafter as a "chain extender" above the limits taught by the prior art. The chain extender is present in combination with an organohydrogenpolysiloxane containing an average of at least three silicon-bonded hydrogen atoms that serves as the crosslinking agent. Alternatively, the crosslinking agent can be a polydiorganosiloxane containing an average of at least three alkenyl radicals per molecule.

SUMMARY OF THE INVENTION

The present invention is based on the discovery that the amount of solvent-extractable materials present in these materials can be reduced without sacrificing other desirable properties of organosiloxane gels, when the curable composition used to prepare the gel contains 1) at least one organohydrogenpolysiloxane with only two silicon-bonded hydrogen atoms per molecule and 2) a crosslinking reactant containing more than two silicon-bonded hydrogen atoms or alkenyl radicals per molecule, where the total number of silicon-bonded hydrogen atoms or alkenyl radicals in excess of two per molecule of crosslinking reactant constitutes from 10 to about 30 percent of the number of these reactive groups present in the composition.

The curable compositions of this invention contain from 0.85 to 1.0 silicon-bonded hydrogen atom per vinyl or other ethylenically unsaturated radical.

The dielectric properties, particularly the dielectric constant and dissipation factor, of cured, preferred fluorosilicone gels are superior relative to gels described in the aforementioned patent to Benditt and Maxson.

DETAILED DESCRIPTION OF THE INVENTION

This invention provides a liquid organosiloxane composition that cures to a gel by means of a platinum group metal catalyzed hydrosilylation reaction and comprises A. 100 parts of a liquid polyorganosiloxane containing two alkenyl radicals per molecule;
B. from 20 to 100 parts of a liquid diorganohydrogensiloxy-terminated polydiorganosiloxane;
C. at least one crosslinking reactant selected from the group consisting of liquid polyorganosiloxanes containing at least three silicon-bonded reactive groups per molecule, where said reactive groups are, in turn, selected from the group consisting of a hydrogen atom and alkenyl radicals, the total number of reactive groups in excess of two per molecule of said crosslinking reactant constitutes from 10 to 30 percent of the number of said reactive groups present in said composition, and the molar ratio of silicon bonded hydrogen atoms to alkenyl radicals in said composition is from 0.85 to about 1.0; and
D. an amount sufficient to promote curing of said composition of a hydrosilylation catalyst selected from the group consisting of metals from the platinum group of the periodic table and compounds of these metals.

A novel feature of the present invention resides in the presence in a curable organosiloxane composition of 1) a polyorganosiloxane containing two alkenyl radicals per molecule, referred to hereinafter as ingredient A, 2) from 20 to 100 percent, based on the weight of said polyorganosiloxane, of a diorganohydrogensiloxy-terminated polydiorganosiloxane, referred to as ingredient B, and 3) an amount of a crosslinking reactant sufficient to cure said composition to a non-flowable gel. This combination of reactants yields a cured gel with less than about 5 weight percent of unreacted liquid material that is extractable using a liquid hydrocarbon.

The crosslinking reactant in the present compositions contains at least three silicon-bonded hydrogen atoms per molecule or three alkenyl radicals per molecule. The total number of alkenyl radicals or silicon-bonded hydrogen atoms in excess of two per molecule of crosslinking reactant consitute from 10 to about 30 percent of these reactive groups present in the composition. This range is preferably from 10 to 15 percent.

The individual ingredients of the present compositions will now be discussed in detail.

THE POLYORGANOSILOXANE CONTAINING TWO ALKENYL RADICALS (INGREDIENT A)

Ingredient A can be either a homopolymer or a copolymer. This ingredient is preferably linear and is represented by the general formula A

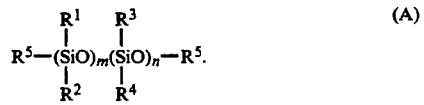

In formula A $R^1$, $R^2$ $R^3$ and $R^4$ are identical or different monovalent unsubstituted or substituted hydrocarbon radicals that are free of ethylenic unsaturation, $R^5$ represents an alkenyl radical, the sum of m and n typically represents a molecular weight equivalent to a viscosity of from 0.1 to 10 Pa.s at 25° C. and the value of m can be from 0 to 10 n.

Each of the radicals represented by $R^1$, $R^2$, $R^3$ and $R^4$ can contain from 1 to about 20 carbon atoms. A range of from 1 to about 10 carbon atoms is preferred based on the availability of the corresponding cyclic diorganosiloxanes used to prepare ingredient A. The alkenyl radical represented by $R^5$ can contain from 2 to about 10 atoms, and includes but is not limited to vinyl, allyl and 5-hexenyl.

Most preferably $R^1$ and $R^3$ are methyl, $R^2$ is methyl or phenyl, $R^4$ is —$CH_2CH_2R_f$, where $R_f$ represents a perfluoroalkyl radical containing from 1 to about 10 carbon atoms, such as trifluoromethyl, perfluoroethyl and perfluorohexyl, and $R^5$ is vinyl or 5-hexenyl.

In particularly preferred embodiments of the present ingredient A, the radicals represented by $R^1$, $R^2$ and $R^3$ are methyl, $R^4$ represents 3,3,3-trifluoropropyl and the value of m is 0 or 2. When m is 2 one of the dimethylsiloxane units is adjacent to each of the two terminal organosiloxane units.

Ingredient A is represented in the foregoing formula as a linear molecule. It will be understood, however, that some of the molecules may contain branching units resulting from small amounts of trifunctional reactants present as impurities in the cyclic diorganosiloxanes used to prepare this ingredient.

Ingredient A can be a single polydiorganosiloxane species or a mixture containing two or more polydiorganosiloxanes of different molecular weights, so long as the viscosity of the mixture is within the aforementioned limits of 0.1 to 10 Pa.s, preferably from 0.2 to 5 Pa.s.

Ingredient A can be prepared using any of the known methods for preparing vinyl-terminated polydiorganosiloxanes. A preferred method is by the ammonia-catalyzed polymerization of the corresponding cyclic diorganosiloxane(s) to form a silanol-terminated polydiorganosiloxane. This method is described in U.S. Pat. No. 4,683,277, which issued to M. T. Maxson on Jul. 28, 1987.

The reactant used to convert the silanol terminated polydiorganosiloxane to a vinyl terminated polymer should be capable of reacting in the presence of relatively weak catalysts such as ammonia. Hexaoganodisilazanes wherein each of the two silicon atoms is bonded to a vinyl radical will react under these conditions and are therefore the reactants of choice for preparing the preferred fluorinated polydiorganosiloxanes referred to hereinafter as ingredient A.

Methods for polymerizing cyclic diorganosiloxanes to liquid silanol terminated polydiorganosiloxanes using a variety of catalysts are sufficiently well described in the literature that a detailed description in this specification is not necessary. When ammonia is used as the catalyst, the polymerization reaction of the cyclic diorganosiloxane is typically conducted at temperatures of from 25 to about 100° C. until the desired molecular weight is achieved.

THE DIORGANOHYDROGENSILOXY-TERMINATED POLYORGANOSILOXANE (INGREDIENT B)

The present compositions are cured by a hydrosilylation reaction between alkenyl radicals and silicon-bonded hydrogen atoms. Ingredient B contains only two silicon bonded hydrogen atoms per molecule, an average of from 3 up to 20 or more silicon atoms per molecule and exhibits a viscosity of up to 1 Pa.s or higher at 25° C. If the crosslinking reactant (ingredient C) contains silicon bonded hydrogen atoms, ingredient B contains from 70 to 90 percent of the silicon-bonded hydrogen atoms present in the composition.

Preferred embodiments of ingredient B are represented by the following general formula B

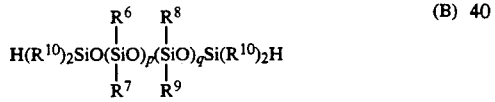

(B)

where $R^6$, $R^7$, $R^8$, $R^9$ and $R^{10}$ represent identical or different unsubstituted or substituted monovalent hydrocarbon radicals selected from the same group as $R^1$ in formula A, p is 0 or a positive integer, q is a positive integer and the average value of sum of p and q is at least three. All of the hydrocarbon radicals with the exception of the one represented by $R^8$ are preferably lower alkyl, most preferably methyl, and $R^8$ represents —$CH_2CH_2R_f$, where $R_f$ represents a perfluoroalkyl radical, most preferably trifluoromethyl.

To ensure compatibility between ingredients A and B, the silicon-bonded hydrocarbon radicals in these ingredients should be similar. Most preferably p is 0 and ingredient B is a linear dimethylhydrogensiloxy terminated organosiloxane containing from 15 to about 30 methyl-3,3,3-trifluoropropylsiloxane units per molecule.

THE CROSSLINKING REACTANT (INGREDIENT C)

In addition to the organohydrogensiloxane containing silicon-bonded hydrogen atoms only at the terminal positions, referred to as a chain extender, the present compositions also include a polyorganosiloxane containing more than two silicon-bonded hydrogen atoms or alkenyl radicals per molecule to provide the degree of crosslinking required to achieve the desired level of hardness in the cured gel. If the crosslinking reactant is omitted entirely the composition following curing is a high molecular weight substantially linear polyorganosiloxane with the consistency of a gum. Such a cured polyorganosiloxane is self-levelling, and will flow under its own weight if given sufficient time.

The total number of reactive groups, i.e. silicon-bonded hydrogen atoms or alkenyl radicals, in excess of two per molecule of crosslinking reactant, referred to herein as crosslinking groups, is determined by the degree of crosslinking desired in the cured material, which in turn determines the hardness of the material. The crosslinking groups are distinguished from the two reactive groups of ingredient C that function as chain extenders. The number of crosslinking groups constitutes from 10 to about 30 percent, preferably from 10 to about 15 percent, of the total number of that reactive group present in the composition.

The crosslinking reactant is preferably miscible with ingredients A and B. With the exception of the silicon bonded "reactive groups", the organic groups bonded to the silicon atoms of ingredient C are selected from the groups of hydrocarbon radicals represented by $R^1$ and —$CH_2CH_2R_f$ in the formula for fluorinated hydrocarbon radical is methyl, the fluorinated hydrocarbon radical is 3,3,3-trifluoropropyl and the reactive groups are silicon-bonded hydrogen atoms or vinyl radicals. Most preferably the crosslinking reactant is an oranohydrogensiloxane represented by formula C.

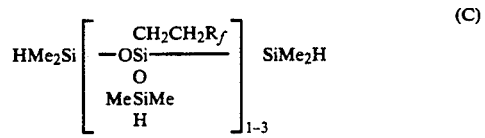

(C)

where Me represents a methyl radical.

The molecular weights of ingredients A and B together with the number and distribution of crosslinking groups in ingredient C will determine the location of crosslinks in the cured gel. The concentration of crosslinks per unit area is often referred to as the "crosslink density" and determines certain physical properties of the cured gel, particularly hardness and resiliency. The particular types and amounts of ingredients A, B and C yielding a desired combination of physical properties can readily be determined by routine experimentation with a knowledge of this invention.

The molar ratio of silicon-bonded hydrogen atoms to vinyl or other ethylenically unsaturated hydrocarbon radicals present in the curable compositions of this invention is a major factor in determining the properties of the cured gel. As disclosed hereinbefore, a preferred type of organosiloxane gels is prepared from curable compositions containing a stoichiometric excess of alkenyl radicals relative to silicon bonded hydrogen atoms. In the present compositions the ratio is typically from 0.85 to 1.0 silicon bonded hydrogen atom per vinyl radical. If all of the reactive groups are consumed during curing of the composition, the composition should preferably contain equimolar amounts of alkenyl radicals and silicon-bonded hydrogen atoms.

The molar ratio of alkenyl radicals to silicon-bonded hydrogen atoms that will minimize the amount of extractable material present in a given composition will be determined at least in part by the average molecular weights of ingredient A and B, together with the type of crosslinker. In preferred compositions the concentration of crosslinking reactant is from 1 to about 5 weight percent, based on the weight of ingredient A.

THE HYDROSILYLATION CATALYST (INGREDIENT D)

Hydrosilylation reactions are typically conducted in the presence of a catalyst that is a platinum group metal or a compound of one of these metals. Platinum compounds such as hexachloroplatinic acid, and particularly complexes of these compounds with relatively low molecular weight, liquid vinyl-containing organosiloxanes, are preferred catalysts because of their high activity and compatibility with the organosiloxane reactants. These complexes are described in U.S. Pat. No. 3,419,593 that issued to David N. Willing on Dec. 31, 1968.

Complexes wherein the silicon bonded hydrocarbon radicals are vinyl and either methyl or 3,3,3-trifluoropropyl are particularly preferred because of their ability to catalyze a rapid curing of the gel at temperatures of at least about 70° C. A particularly preferred catalyst of this type is the complex formed by reacting hexachloroplatinic acid with a liquid dimethylvinylsiloxy terminated poly(methyl-3,3,3-trifluoropropyl) siloxane.

Ingredient D can be present in an amount equivalent to as little as one part by weight of platinum or other platinum group metal per one million parts of curable composition. Catalyst concentrations equivalent to from 3 to 10 parts of platinum per million of curable composition are preferred to achieve a practical curing rate. Higher concentrations of platinum provide only marginal improvements in curing rate, and are therefore economically unattractive, particularly when the preferred catalysts are used.

Compositions containing ingredients A, B, C, and D may begin to cure under ambient conditions. One method for avoiding premature curing is to store the composition at temperatures below ambient, preferably in the presence of a known platinum catalyst inhibitor. Suitable inhibitors include but are not limited to acetylenic organic compounds, including the hydrocarbons and alcohols claimed in U.S. Pat. No. 3,445,420; the N-alkylated diamines described in U.S. Pat. No. 4,584,361; and cyclic alkylvinylsiloxanes.

Alternatively, the catalyst and the organohydrogensiloxane(s) are separated from one another until such time as it is desired to cure the composition. This can be achieved by packaging the organohydrogensiloxane and the hydrosilylation catalyst in separate containers.

Another way of separating the organohydrogensiloxanes and the hydrosilylation catalyst is to microencapsulate the catalyst in at least one layer of a thermoplastic or thermosetting organic or organosilicone resin that is melted or fractured when it is desired to cure the composition. Curable organosiloxane compositions containing microencapsulated platinum hydrosilylation catalysts are described in U.S. Pat. No. 4,766,176, which issued to C. Lee et al. on Aug. 23, 1988. Suitable thermoplastic organic polymers include but are not limited to homopolymers and copolymers of ethylenically unsaturated acids such as acrylic and methacrylic acids and esters of these acids, and homopolymers and copolymers of ethylencially unsaturated hydrocarbons such as styrene-butadiene copolymers.

In some instances it has been found that the combination of a microencapsulated platinum-containing hydrosilylation catalyst and a platinum catalyst inhibitor such as methylbutynol increases the storage stability of the composition while increasing the cure rate of the compositions under conditions that liberate the catalyst.

OPTIONAL INGREDIENTS

In addition to the ingredients referred to as A, B, C and D the curable compositions of this invention can contain a variety of optional ingredients to modify the properties of the curable composition or the gel prepared by curing the composition.

Typical optional ingredients present in curable organosiloxane compositions include but are not limited to reinforcing and non-reinforcing fillers such as finely divided silica and quartz, heat stabilizers such as cerric oxide and metal acetlyacetonates, pigments such as carbon black, electrically and thermally conductive fillers such as finely divided metals and metal oxides, and flame-retarding materials.

PREPARATION OF CURABLE COMPOSITIONS

The one-part compositions of this invention are typically prepared by blending the foregoing ingredients A, B, C, D and any optional ingredients such as a platinum catalyst inhibitor to form a homogeneous composition. The inhibitor allows the composition to be stored under ambient conditions for a period of several days up to several months, depending upon the type and concentration of inhibitor.

When it is desired to cure a composition, it is heated at a temperature of about 100° C. or above until the desired degree of curing has been achieved. Temperatures of about 150° C. are preferred. It should be apparent that compositions containing a hydrosilylation catalyst that is microencapsulated in a thermoplastic material such as an organic or an organosilicone polymer must be heated above the melting or softening temperature of the polymer to release the catalyst.

The degree of curing of the gels formed from the present compositions can be conveniently determined by measuring the distance to which a penetrometer probe of known weight penetrates into the cured gel during a specified period of time. For preferred gels this value is from 1 to 12 mm. using a probe with a diameter of 0.125 inch (3.2 mm) and a combined probe and plunger weight of 14 g. The residence time of the probe on the surface of the sample is 5 seconds.

When applied as a thin layer the present fluorosilicone compositions cure in as little as 15 minutes at 150° C. It will be understood that the cure time is inversely proportional to curing temperature.

The gels obtained by curing the polyorganosiloxane compositions of this invention are useful as potting compounds and conformal coatings, and are particularly useful for coating and encapsulating semiconductor devices and electronic circuits containing these devices. These devices and circuits are susceptible to damage by moisture or other contaminants present at locations where they are installed. Other than an increase in stiffness, the structural integrity of fluorosilicone gels is not adversely affected by temperatures as low as −70° C., and the gels are resistant to liquid hydrocarbons and other types of organic solvents.

The following examples demonstrate the uniqueness of representative catalyst inhibitors with respect to their chemical composition and the polyorganosiloxane compositions that can be a) stabilized and b) cured in small amounts using these inhibitors. All parts and percentages are by weight unless otherwise specified, and viscosities were measured at 25° C.

EXAMPLE 1

Two curable compositions of this invention were prepared by blending the following ingredients to homogeneity:

As ingredient A, a dimethylvinylsiloxy terminated poly(methyl-3,3,3-trifluoropropyl)siloxane containing 1.05% of vinyl radicals and exhibiting a viscosity of 1.4 Pa.s. Ingredient A had been prepared by the ammonia catalyzed polymerization of 2,4,6-trimethyl-2,4,6-tris(3,3,3-trifluoropropyl)cyclotrisiloxane followed by reaction of the resultant silanol terminated polydiorganosiloxane with sym-tetramethyldivinyl-disilazane.

As ingredient B, a dimethylhydrogensiloxy-terminated polymethyl-3,3,3-trifluoropropylsiloxane containing an average of 20 repeating units per molecule;

as ingredient C, an organohydrogensiloxane crosslinking reactant represented by the average formula

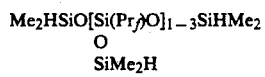

$$Me_2HSiO[Si(Pr_f)O]_{1-3}SiHMe_2$$
$$O$$
$$SiMe_2H$$

where $Pr_f$ represents the 3,3,3-trifluoropropyl radical;

as a platinum-containing catalyst (ingredient D1), a reaction product of hexachloroplatinic acid and sym-tetramethyldivinyldisiloxane that has been diluted with a liquid dimethylvinylsiloxy terminated polydimethylsiloxane in an amount sufficient to achieve a platinum content of 0.7 weight percent, as a second platinum-containing catalyst (ingredient D2), a complex containing 0.67% platinum and prepared by the reaction of hexachloroplatinic acid with a liquid dimethylvinylsiloxy terminated poly(-methyl-3,3,3-trifluoropropyl)siloxane;

as the platinum catalyst inhibitor 1-ethynyl-1-cyclohexanol (ingredient E1) or 3-phenyl-1-butyn-3-ol (ingredient E2); and as a heat stabilizer (ingredient F), a 37.5 percent dispersion of copper acetylacetonate in a liquid trimethylsiloxy-terminated polymethyl-3,3,3-trifluoropropylsiloxane.

The amounts of the various ingredients in each of the two compositions are recorded in Table 1.

The resultant compositions exhibited substantially no increase in viscosity during storage for 7 days at a temperature of 23° C.

The ability of small portions of the curable compositions to cure at 150° C. was demonstrated by placing one drop (equivalent to about 0.12 g.) of the each composition in an indentation formed in an aluminum panel. The panels were then placed in an oven maintained at a temperature of 150° C. to cure the composition. A soft gel was obtained in 20 minutes.

TABLE 1

| Ingredient | Parts | |
|---|---|---|
| | Composition 1A | Composition 1B |
| A | 150 | 100 |
| B | 102.9 | 68.6 |
| C | 2.45 | 1.65 |
| D1 | 0.27 | 0.18 |
| D2 | 0.06 | 0.06 |
| E1 | 0.84 | 0 |

TABLE 1-continued

| Ingredient | Parts | |
|---|---|---|
| | Composition 1A | Composition 1B |
| E2 | 0 | 0.56 |
| F | 0.35 | 0.25 |

The penetration value of the cured gel prepared from composition 1A was determined by heating a 50 g sample of the curable composition of this invention at 150° C. for four hours to form a 20 mm-thick sample of cured gel. The penetration value of the gel was measured using a penetrometer manufactured by Precision Scientific Company (Catalog Number 73,510). The standard cones supplied with the instrument were replaced with a brass head measuring 3.2 mm. in diameter, 4.672 mm. in height and having a flat bottom and rounded edges. The total weight of the shaft and head was 14 grams, and the penetration reading was taken five seconds after placement of the head on the surface of the cured gel. The penetration value was 13.6 mm.

The penetration value for the cured gel prepared from composition 1B, determined in the same manner described for the gel from composition 1A, was 13.3 mm.

The thermal stability of the gel prepared using composition 1B was evaluated subjectively by observing the ability of the gel to remain soft and compressible after being heated at 150°, 175° and 200° C. for intervals of 300, 800 and 1600 hours. The results of these evaluations are recorded in Table 2.

TABLE 2

| Time Interval | Temperature (°C.) | | |
|---|---|---|---|
| (Hours) | 150 | 175 | 200 |
| 300 | Soft | Soft | Soft |
| 800 | Soft | Soft | Firm |
| 1600 | Soft | Soft | Firm |

For comparative purposes a curable organosiloxane composition lacking the diorganohydrogensiloxy-terminated polydiorganosiloxane present in the curable composition of the present invention was prepared by blending the following ingredients to homogeneity:

96 parts of the polydiorganosiloxane referred to as ingredient A in Example 1;

3.2 parts of the organohydrogenpolysiloxane referred to as ingredient C in Table 1;

as the platinum-containing catalyst, 0.1 part of the platinum-containing hydrosilylation catalyst referred to as ingredient D2 in Example 1;

0.01 part of 2-methyl-3-butyn-2-ol as a first catalyst inhibitor;

as a second catalyst inhibitor, 0.39 part of N,N,N',N'-tetramethylethylenediamine (TMEDA) as a 0.1 percent solution in a silanol-terminated poly(methyl-3,3,3-trifluoropropyl)siloxane exhibiting a viscosity of 0.3 Pa.s; and as the heat stabilizer for the cured gel 0.10 part of copper acetylacetonate as a 60 weight percent dispersion in a silanol-terminated poly(methyl-3,3,3-trifluoropropyl)siloxane exhibiting a viscosity of $1 \times 10^{-2}$ m²/sec.

This composition was cured by heating it for four hours at a temperature of 150° C. The penetration value of the cured gel, measured as described in the preceding section of this specification, was 11.7 mm.

The resistance of the cured gels prepared from composition 1B and the comparison prior art composition to swelling resulting from absorption of unleaded gasoline and a mixture of unleaded gasoline containing 15 weight percent of methyl-t-butyl ether was determined by immersing two grams of the cured gel in 300 g. of the gasoline for 38 days at a temperature of 23° C. The samples were then weighed again and the percent weight gain was calculated.

The test was repeated using unleaded gasoline containing 15 weight percent of methyl-t-butyl ether. The results of the fuel immersion tests are recorded in Table 3.

The percent by weight of extractable material present in the initial cured gel was determined by immersing a gel sample of known weight in the liquid extractant for 38 days at a temperature of 23° C. allowing the gel to dry for from 2 to 5 days under ambient conditions, again weighing the gel sample and subtracting this weight from the original weight of the sample.

TABLE 3

| Gel Sample | Fuel Immersion Test | |
|---|---|---|
| | Percent Weight Gain | Percent Extractables |
| 1B | | |
| Gasoline | 17.4 | 2 |
| Gasoline + MTBE | 23.6 | 4 |
| Comparative Gel | | |
| Gasoline | −1.4 | 18.7 |
| Gasoline + MTBE | −3.4 | 25.1 |

The negative values for the weight gain of the comparative examples are the result of the large amount of organosiloxane material extracted from the gel while it was immersed in the gasoline. In the case of the gel prepared using composition 1B the weight of gasoline absorbed more than compensated for the amount of organosiloxane material extracted.

The dissipation factor and dielectric constant of the cured gels prepared from composition 1B and the comparative composition were measured at five different frequencies using the procedure described in ASTM test procedure D 150. The results are recorded in Table 4.

TABLE 4

| Frequency (Hz) | Dielectric Properties | | | |
|---|---|---|---|---|
| | Dissipation Factor | | Dielectric Constant | |
| | 1B | Comparison | 1B | Comparison |
| 1 | 0.9645 | 5.724 | 6.122 | 8.141 |
| 10 | 0.0966 | 0.7871 | 6.178 | 6.133 |
| 100 | 0.0100 | 0.080 | 6.167 | 6.050 |
| 1000 | 0.00135 | 0.0089 | 6.163 | 6.040 |
| 10,000 | 0.00234 | N.D. | 6.150 | N.D. |

N.D. = Value not determined

It should be apparent that the gel prepared using composition 1B of the present invention exhibited lower dissipation factors and, with the exception of the values at 1 Hertz, higher dielectric constants than the prior art material used as the comparison composition.

That which is claimed is:

1. A liquid organosiloxane composition that cures to a gel by means of a platinum group metal catalyzed hydrosilylation reaction and comprises
A. 100 parts of a liquid polyorganosiloxane containing two alkenyl radicals per molecule;
B. from 20 to 100 parts of a liquid diorganohydrogensiloxy-terminated polydiorganosiloxane;
C. at least one crosslinking reactant selected from the group consisting of liquid polyorganosiloxanes containing at least three silicon-bonded reactive groups per molecule, where said reactive groups are, in turn, selected from the group consisting of a hydrogen atom and alkenyl radicals and the total number of reactive groups in excess of two per molecule of said crosslinking reactant constitutes from 10 to 30 percent of the number of said reactive groups present in said composition and the molar ratio of silicon bonded hydrogen atoms to alkenyl radicals in said composition is from 0.85 to about 1.0; and
D. an amount sufficient to promote curing of said composition of a hydrosilylation catalyst selected from the group consisting of metals from the platinum group of the periodic table and compounds of these metals.

2. A composition according to claim 1 where said liquid polyorganosiloxane A is represented by the formula

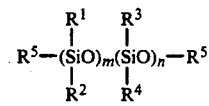

where $R^1$, $R^2$, $R^3$, and $R^4$ are identical or different monovalent unsubstituted or substituted hydrocarbon radicals, $R^5$ represents an alkenyl radical, the sum of m and n represents a molecular weight equivalent to a viscosity of from 0.2 to 20 Pa.s at 25° C. and the value of m is from 0 to 10n;

the diorganohydrogensiloxy-terminated polydiorganosiloxane is represented by the general formula

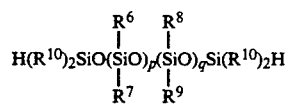

where $R^6$, $R^7$, $R^8$, $R^9$, and $R^{10}$ represent identical or different monovalent unsubstituted or substituted hydrocarbon radicals, p is O or a positive integer, q is a positive integer and the average value of the sum of p and q is at least three; and the total number of reactive groups in excess of two per molecule said crosslinking reactant constitutes form 10 to 15 percent of the number of reactive groups present in said composition.

3. A composition according to claim 2 where the hydrocarbon radicals represented by $R^1$, $R^2$, $R^3$, $R^6$, $R^7$, $R^9$ and $R^{10}$ are lower alkyl radicals;

$R^4$ and $R^8$ are —$CH_2CH_2R_f$ where $R_f$ represents a perfluoroalkyl radical;

$R_5$ represents vinyl; and said catalyst is a complex of chloroplatinic acid and a liquid vinyl-containing organosiloxane compound; and the composition contains a platinum catalyst inhibitor.

4. A composition according to claim 3 where said lower alkyl radicals are methyl, $R_f$ is trifluoromethyl and said crosslinking reactant is represented by the formula (C) 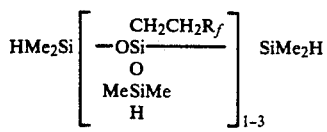

where Me represents a methyl radical.

5. A composition according to claim 4 where said catalyst is microencapsulated within at least one layer of a thermoplastic or thermosetting polymer.

6. A composition according to claim 4 where the ingredients of said composition are packaged in at least two containers prior to being blended to form said composition, and where said catalyst is located in a different container than the organosilicon compounds containing silicon-bonded hydrogen atoms.

* * * * *